(12) United States Patent
Ogawa et al.

(10) Patent No.: US 8,794,089 B2
(45) Date of Patent: Aug. 5, 2014

(54) TRANSMISSION

(75) Inventors: Hiroshi Ogawa, Tokyo (JP); Yasuyuki Ukon, Tokyo (JP); Ryota Takayanagi, Tokyo (JP); Masaya Miyazaki, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 166 days.

(21) Appl. No.: 13/429,155

(22) Filed: Mar. 23, 2012

(65) Prior Publication Data
US 2012/0240698 A1 Sep. 27, 2012

(30) Foreign Application Priority Data
Mar. 25, 2011 (JP) ................................. 2011-067706

(51) Int. Cl.
*F16H 3/08* (2006.01)
(52) U.S. Cl.
USPC ............................. 74/333; 74/337.5; 74/339
(58) Field of Classification Search
USPC ................... 74/325, 333, 337.5, 339
See application file for complete search history.

(56) References Cited

U.S. PATENT DOCUMENTS

| 7,886,627 | B2* | 2/2011 | Martin | 74/335 |
| 8,291,784 | B2* | 10/2012 | Martin et al. | 74/329 |
| 2006/0207362 | A1* | 9/2006 | Martin | 74/322 |
| 2008/0194370 | A1 | 8/2008 | Martin et al. | |
| 2009/0227419 | A1 | 9/2009 | Martin et al. | |
| 2009/0301241 | A1* | 12/2009 | Martin et al. | 74/335 |
| 2010/0257969 | A1* | 10/2010 | Martin et al. | 74/374 |

FOREIGN PATENT DOCUMENTS

| JP | 2009-536713 A | 10/2009 |
| WO | WO 2007/132209 A2 | 11/2007 |

* cited by examiner

*Primary Examiner* — Ha D Ho
(74) *Attorney, Agent, or Firm* — McGinn IP Law Group, PLLC

(57) ABSTRACT

A transmission includes first and second rotating shafts arranged in parallel and multiple gear sets including gears fixed to the first rotating shaft and rotatable gears rotatably supported on the second rotating shaft. Each gear set includes first and second engagement units engaged with first and second engagement-target portions formed on end surfaces of each rotatable gear and transmitting torque in first and second rotational directions; and a shift mechanism axially and independently moving the first and second engagement units. Each one of the first and second engagement units has a slanted portion allowing the engagement unit to withdraw from the rotatable gear when the other one of the engagement units is disengaged and torque transmitted in a corresponding direction is input. Each one of the first and second engagement unit of each gear set moves integrally with the other one of the engagement units of an adjacent gear set.

7 Claims, 4 Drawing Sheets

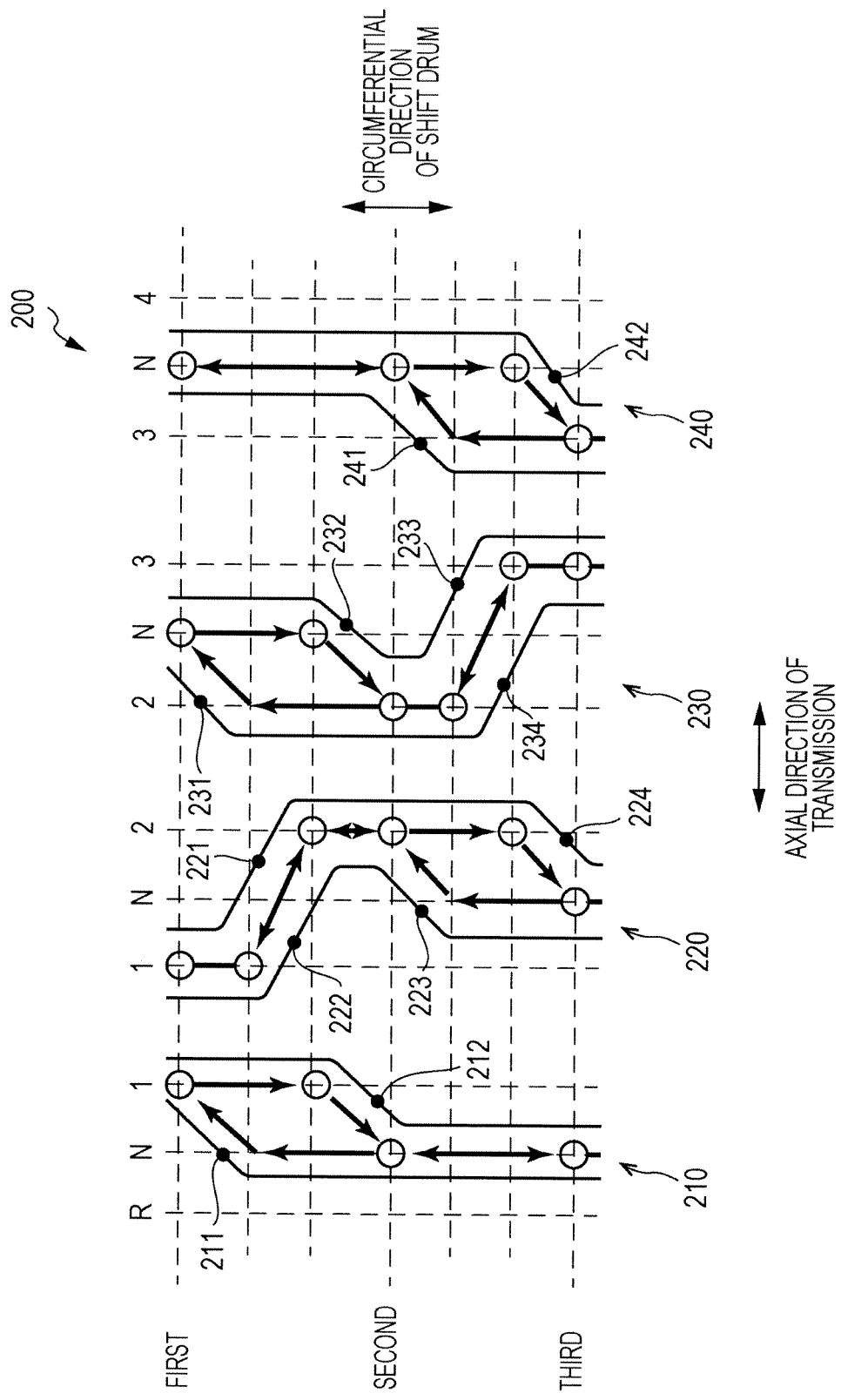

TRANSMISSION

CROSS-REFERENCE TO RELATED APPLICATIONS

The present application claims priority from Japanese Patent Application No. 2011-067706 filed on Mar. 25, 2011, the entire contents of which are hereby incorporated by reference.

BACKGROUND OF THE INVENTION

1. Field of the Invention

The present invention relates to a transmission that performs a gear change by selecting one from among multiple transmission gear sets, and particularly to a transmission that reduces a torque interruption period in a gear change and that has a simple structure.

2. Description of the Related Art

Automatic transmissions for vehicles include one having a combination of multiple planetary gear sets and a continuously variable transmission (CVT) employing a variator such as a chain variator, belt variator, and troidal variator. These automatic transmissions have not yet reached the level of manual transmissions, in which multiple gear sets arranged between a pair of rotating shafts are sequentially switched from one to another, in terms of transmission efficiency, weight reduction, and compactness.

To address this situation, an automatic transmission has been proposed in which an actuator performs shifting, selecting, and clutching operations that are performed manually in a manual transmission. This automatic transmission, however, needs to temporarily disengage the clutch before performing a gear change, and thus the torque interruption period is long.

Furthermore, a double clutch transmission (DCT) has also been proposed that includes two separate clutches and drive shafts for odd and even gear speeds. The DCT performs gear changes by switching between these clutches and drive shafts. However, the DCT has a complex structure and a large weight.

Japanese Unexamined Patent Application Publication (Translation of PCT Application) No. 2009-536713 describes the following transmission, which is an example of the conventional technology relating to a highly efficient transmission causing a short driving interruption period. Specifically, the transmission causes substantially no torque interruption and performs instantaneous gear changes by sequentially switching engagement states of first and second gear members included in each of gears, which are supported on a rotating shaft so as to be rotatable relative to the rotating shaft. The first gear member transmits a driving force in one rotational direction and the second gear member transmits a driving force in another rotational direction.

The transmission described in Japanese Unexamined Patent Application Publication (Translation of PCT Application) No. 2009-536713 includes a selector mechanism that has gear members between first and second gear ratios, between third and fourth gear ratios, and between fifth and sixth gear ratios.

The above transmission can perform instantaneous gear changes between first and second gear ratios, between third and fourth gear ratios, and between fifth and sixth gear ratios. However, as to the gear changes between second and third gear ratios and between fourth and fifth gear ratios, it is only after engagement members of the gear ratios with which the engagement members are engaged before the gear changes are moved to neutral positions that the transmission can start driving the engagement members of the gear ratios with which the engagement members are engaged after the gear changes. Thus, the gear changes between these gear ratios take more time.

SUMMARY OF THE INVENTION

The present invention aims to provide a transmission that enables speedy gear changes between all the gear ratios and that has a simple structure.

The present invention has been made to solve the above problems by the following measures.

According to an aspect of the present invention, there is provided a transmission including: a first rotating shaft; a second rotating shaft arranged in parallel with the first rotating shaft; and a plurality of gear sets that transmit power between the first rotating shaft and the second rotating shaft. The gear sets are disposed in order from low to high gear ratios. Each gear set includes a fixed gear that is fixed to the first rotating shaft and a rotatable gear that is supported on the second rotating shaft so as to be rotatable relative to the second rotating shaft, and the rotatable gear meshes with the fixed gear. Each gear set includes a first engagement unit, a second engagement unit, and a shift mechanism. The first engagement unit is engaged with a first engagement-target portion formed on one end surface of the rotatable gear and transmits torque in a first rotational direction. The second engagement unit is engaged with a second engagement-target portion formed on another end surface of the rotatable gear and thus transmits torque in a second rotational direction that is a direction opposite to the first rotational direction. The shift mechanism moves the first engagement unit and the second engagement unit independently of each other and relative to the rotatable gear in the axial direction. The first engagement unit has a slanted portion that is contacted by the first engagement-target portion and that thus allows the first engagement unit to withdraw from the rotatable gear while the second engagement unit is disengaged and when torque in the second rotational direction is input. The second engagement unit has a slanted portion that is contacted by the second engagement-target portion and that thus allows the second engagement unit to withdraw from the rotatable gears while the first engagement unit is disengaged and when torque in the first rotational direction is input. The first engagement unit of each gear set is configured to move integrally with the second engagement unit of an adjacent one of the gear sets, and the second engagement unit of each gear set is configured to move integrally with the first engagement unit of an adjacent one of the gear sets.

With the aspect of the present invention, the first engagement unit of one gear set and the second engagement unit of an adjacent gear set move integrally. For this reason, there is no need to provide separate actuators for driving these engagement units and thus a simple transmission structure is achieved.

The first engagement unit and the second engagement unit of each gear set are disposed on both sides of the gear. Thus, upshifting and downshifting operations between all the gear ratios can be speedily performed in substantially the same manner.

In the transmission, the gear sets corresponding first to N-th (where N is an integer) gear ratios may be arranged in order. Between each pair of adjacent gear sets corresponding to the first to N-th gear ratios, the first engagement unit of one of the gear sets corresponding to a lower one of the gear ratios and the second engagement unit of another one of the gear sets corresponding to a higher one of the gear ratios are arranged so as to move integrally.

In the transmission, the first engagement unit may transmit torque while power is off. The second engagement unit may transmit torque while power is on. The shift mechanism may disengage the first engagement unit of one of the gear sets that has been engaged before a gear change and concurrently may engage the second engagement unit of another one of the gear sets that is to be engaged after the gear change, and then, after the second engagement unit of the gear set that has been engaged before the gear change is contacted by the second engagement-target portion and thus disengaged, the shift mechanism may engage the first engagement unit of the gear set that is to be engaged after the gear change.

As described above, according to the present invention, it is possible to provide a transmission that enables speedy gear changes between all the gear ratios and that has a simple structure.

BRIEF DESCRIPTION OF THE DRAWINGS

FIG. 4 illustrates part of shapes of cam grooves formed in a shift drum of the transmission illustrated in FIG. 1.

DESCRIPTION OF THE PREFERRED EMBODIMENTS

According to the present invention, an object, that is, to provide a transmission that performs speedy gear changes between all the gear ratios is achieved by the following manner. A driving torque and a driven torque are transmitted by engagement members provided independently of each other on both sides of each gear, and a driving-side engagement member for each gear and a driven-side engagement member for an adjacent gear are integrally arranged in a space between these gears.

Embodiment

A transmission according to an embodiment of the present invention will be described below.

The transmission according to the embodiment is, for example, an automatic transmission that accelerates or decelerates the speed of revolutions output from an engine of a vehicle such as a passenger car. The transmission achieves six forward speeds and one reverse speed.

The engine changes torque in cooperation with control of the transmission by using output control means such as an electronically controlled throttle for the purpose of, for example, synchronization of the number of revolutions.

Figure 1:
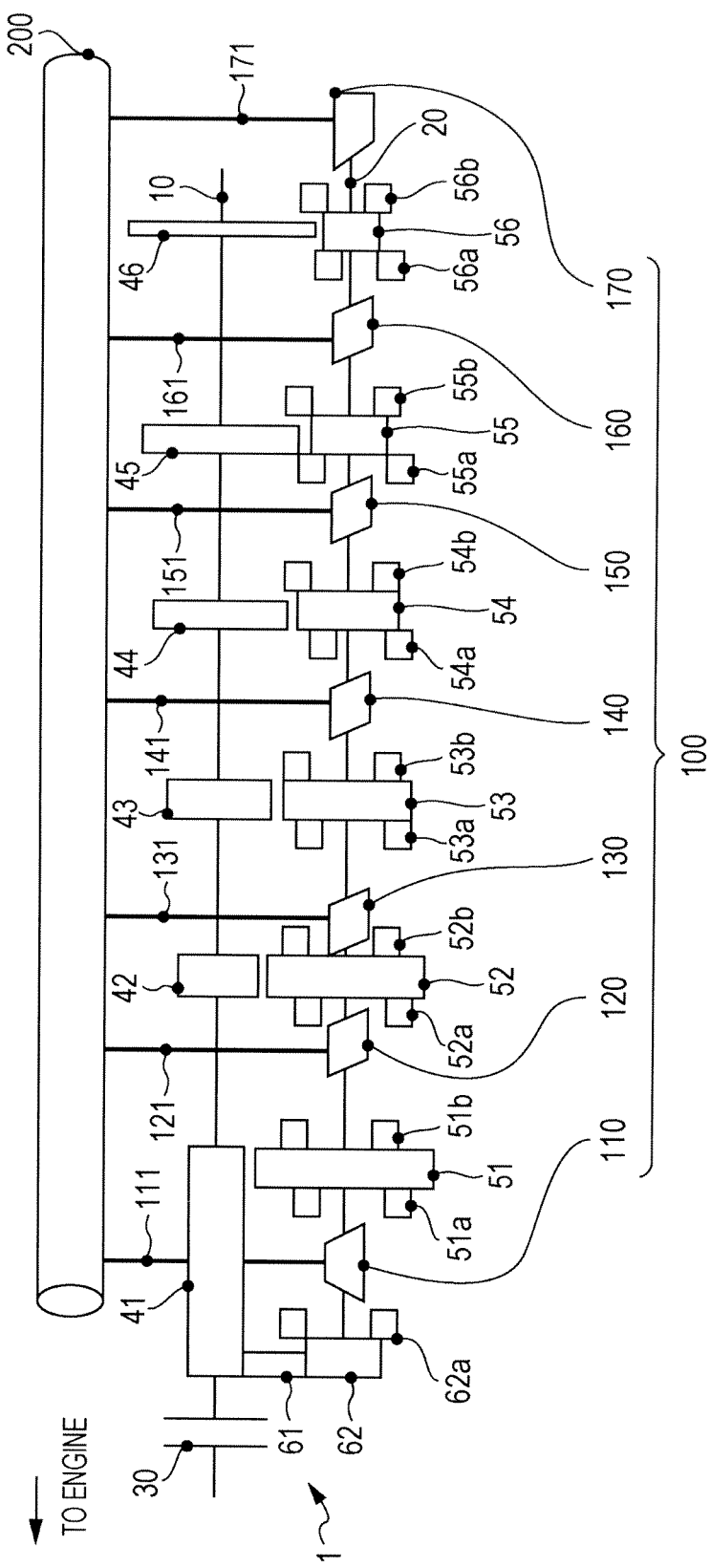
FIG. 1 illustrates a structure of a transmission according to an embodiment of the present invention.

FIG. 1 is a schematic diagram illustrating a structure of the transmission according to the embodiment.

A transmission 1 includes a drive shaft 10, a driven shaft 20, and a clutch 30.

The drive shaft 10 is a rotating shaft that receives an output from an engine, which is not illustrated, and drives the driven shaft 20 via gear sets that are described below.

The driven shaft 20 is a rotating shaft driven by the drive shaft 10.

The driven shaft 20 transmits power to driving wheels of a vehicle via a driving system, which is not illustrated, including an all-wheel-drive (AWD) transfer and an axle differential.

The clutch 30 is disposed between the engine and the drive shaft 10. The clutch 30 is, for example, a dry friction clutch that transmits or interrupts power.

The clutch 30 is engaged or disengaged by an actuator controlled by a command from a transmission control unit, which is not illustrated.

The transmission 1 according to the embodiment can upshift without disengaging the clutch 30. The transmission 1 can also downshift without disengaging the clutch 30. However, in order to prevent inconveniences such as an excessive increase in the number of engine revolutions or a gear change shock, the clutch 30 is temporarily disengaged, and the clutch 30 is engaged again after blipping control for increasing the number of engine revolutions is performed.

The clutch 30 is also used as a starting device for starting a vehicle that is in a stationary state.

A first drive gear 41, a second drive gear 42, a third drive gear 43, a fourth drive gear 44, a fifth drive gear 45, and a sixth drive gear 46 are mounted on the drive shaft 10 in this order from a side closer to the clutch 30.

The number of teeth increases in order from the first to sixth drive gears 41 to 46.

The drive gears 41 to 46 are formed integrally with or fixed to the drive shaft 10.

The first drive gear 41 drives a reverse driven gear 62 via an idler gear 61 that is described below.

A first driven gear 51, a second driven gear 52, a third driven gear 53, a fourth driven gear 54, a fifth driven gear 55, and a sixth driven gear 56 are mounted on the driven shaft 20.

The number of teeth decreases in order from the first to sixth driven gears 51 to 56.

The driven gears 51 to 56 are rotatable about the axis of the driven shaft 20 and relative to the driven shaft 20.

driven gears 51 to 56 respectively mesh with the drive gears 41 to 46 for corresponding gear ratios and thus power is transmitted from the drive shaft 10 to the driven shaft 20.

The driven gears 51 to 56 respectively have dog teeth 51a to 56a on engine-side end surfaces thereof. The dog teeth 51a to 56a have, for example, a projecting shape.

The driven gears 51 to 56 also have similarly shaped dog teeth 51b to 56b on end surfaces thereof that are on the sides opposite to the engine-side surfaces.

The transmission 1 also includes the idler gear 61 and the reverse driven gear 62.

The idler gear 61 meshes with the first drive gear 41 and the reverse driven gear 62 and thus transmits power from the first drive gear 41 to the reverse driven gear 62.

The reverse driven gear 62 is disposed near a front-end portion of the driven shaft 20 and is rotatable about the axis of the driven shaft 20.

The reverse driven gear 62 has dog teeth 62a on a surface that is on the side opposite to an engine-side surface thereof. The dog teeth 62a have, for example, a projecting shape.

The transmission 1 also includes a transmission mechanism 100 that is described below.

The transmission system 100 includes a reverse-first engagement member 110, a first-second engagement member 120, a second-third engagement member 130, a third-fourth engagement member 140, a fourth-fifth engagement member 150, a fifth-sixth engagement member 160, and a sixth engagement member 170.

These engagement members 110 to 170 are engaged with the dog teeth 51a to 56a, 51b to 56b, and 62a of the driven gears 51 to 56 and 62 and thus transmit torque between the driven gears 51 to 56 and 62 and the driven shaft 20.

The engagement members 110 to 170 are restrained from rotating about the axis of the driven shaft 20 and supported on the driven shaft 20 so as to be movable straight substantially in the axial direction.

Each of the engagement members 110 to 170 is held by a detent system or the like so as to be detained at any of the following three positions along the axis of the driven shaft 20, that is, a neutral position; a first position to the front of the neutral position (a position displaced toward the engine); and a second position to the rear of the neutral position (a position displaced in such a direction as to move away from the engine).

The reverse-first engagement member 110 is disposed between the reverse driven gear 62 and the first driven gear 51.

When at the first position, the reverse-first engagement member 110 transmits a driving torque (torque from the engine to the wheels) from the dog teeth 62a of the reverse driven gear 62 to the driven shaft 20. When at the second position, the reverse-first engagement member 110 transmits a driving torque from the dog teeth 51a of the first driven gear 51 to the driven shaft 20.

The first-second engagement member 120 is disposed between the first driven gear 51 and the second driven gear 52.

When at the first position, the first-second engagement member 120 transmits a driven torque (torque from the wheels to the engine, or, what is called a back torque caused by engine braking or the like) from the driven shaft 20 to the dog teeth 51b of the first driven gear 51. When at the second position, the first-second engagement member 120 transmits a driving torque from the dog teeth 52a of the second driven gear 52 to the driven shaft 20.

The second-third engagement member 130 is disposed between the second driven gear 52 and the third driven gear 53.

When at the first position, the second-third engagement member 130 transmits a driven torque from the driven shaft 20 to the dog teeth 52b of the second driven gear 52. When at the second position, the second-third engagement member 130 transmits a driving torque from the dog teeth 53a of the third driven gear 53 to the driven shaft 20.

The third-fourth engagement member 140 is disposed between the third driven gear 53 and the fourth driven gear 54.

When at the first position, the third-fourth engagement member 140 transmits a driven torque from the driven shaft 20 to the dog teeth 53b of the third driven gear 53. When at the second position, the third-fourth engagement member 140 transmits a driving torque from the dog teeth 54a of the fourth driven gear 54 to the driven shaft 20.

The fourth-fifth engagement member 150 is disposed between the fourth driven gear 54 and the fifth driven gear 55.

When at the first position, the fourth-fifth engagement member 150 transmits a driven torque from the driven shaft 20 to the dog teeth 54b of the fourth driven gear 54. When at the second position, the fourth-fifth engagement member 150 transmits a driving torque from the dog teeth 55a of the fifth driven gear 55 to the driven shaft 20.

The fifth-sixth engagement member 160 is disposed between the fifth driven gear 55 and the sixth driven gear 56.

When at the first position, the fifth-sixth engagement member 160 transmits a driven torque from the driven shaft 20 to the dog teeth 55b of the fifth driven gear 55. When at the second position, the fifth-sixth engagement member 160 transmits a driving torque from the dog teeth 56a of the sixth driven gear 56 to the driven shaft 20.

The sixth engagement member 170 is disposed on a side of the sixth driven gear 56 that is opposite to a fifth driven gear 55 side.

When at the first position, the sixth engagement member 170 transmits a driven torque from the driven shaft 20 to the dog teeth 56b of the sixth driven gear 56.

Each of the engagement members 110 to 170 has an engagement portion that is engaged with the dog teeth. The engagement portion has a slanted portion on a surface that is different from surfaces against which the dog teeth are pressed during torque transmission. The slanted portion is formed by cutting each of the engagement members 110 to 170 obliquely with respect to the axial direction of the engagement member.

When the slanted portion is contacted and pushed by the corresponding dog tooth during gear changes, the engagement member is moved away from the corresponding driven gear and is driven in such a direction as to be disengaged from the driven gear.

Functions of the slanted portion will be described in detail below.

The reverse-first engagement member 110, the first-second engagement member 120, the second-third engagement member 130, the third-fourth engagement member 140, the fourth-fifth engagement member 150, the fifth-sixth engagement member 160, and the sixth engagement member 170 are respectively joined to shift forks 111, 121, 131, 141, 151, 161, and 171 via link members, which are not illustrated, such as hub sleeves.

These shift forks 111 to 171 are joined to the shift drum 200 and driven by the shift drum 200 in the axial direction.

The shift forks 111 to 171 are engaged with circumferential grooves formed in the outer peripheral surfaces of the hub sleeves. The shift forks 111 to 171 can drive the hub sleeves in the axial direction while allowing the hub sleeves to rotate about the axis.

The shift drum 200 is substantially cylindrical.

Cam grooves are formed on the outer peripheral surface of the shift drum 200. The cam grooves guide cam followers formed at end portions of the shift forks 111 to 171 so that the shift forks 111 to 171 are driven in the axial direction of the transmission 1.

The shift drum 200 is rotated by an actuator, such as a stepping motor, that is controlled by a transmission control unit, which is not illustrated.

The shapes of the cam grooves of the shift drum 200 will be described in detail below.

Next, upshifting and downshifting operations of the transmission 1 according to the embodiment will be described.

The upshifting operation will be described first, by taking, as an example, a case of upshifting from the second third gear ratio while the power is on (in a state where torque is transmitted from the engine to the driving wheels).

Figure 2A:
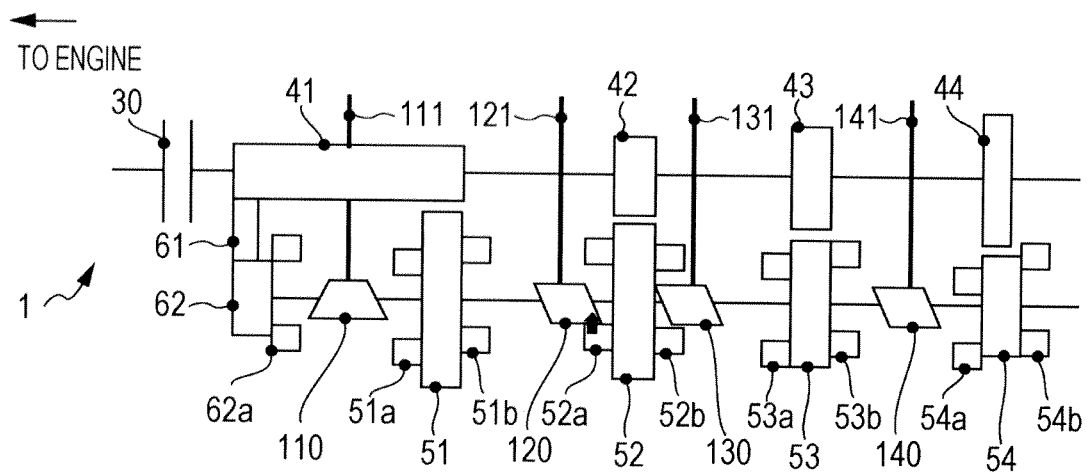
FIGS. 2A, 2B, and 2C illustrate an operation of the transmission illustrated in FIG. 1, for upshifting from the second to third gear ratio.
Figure 2B:
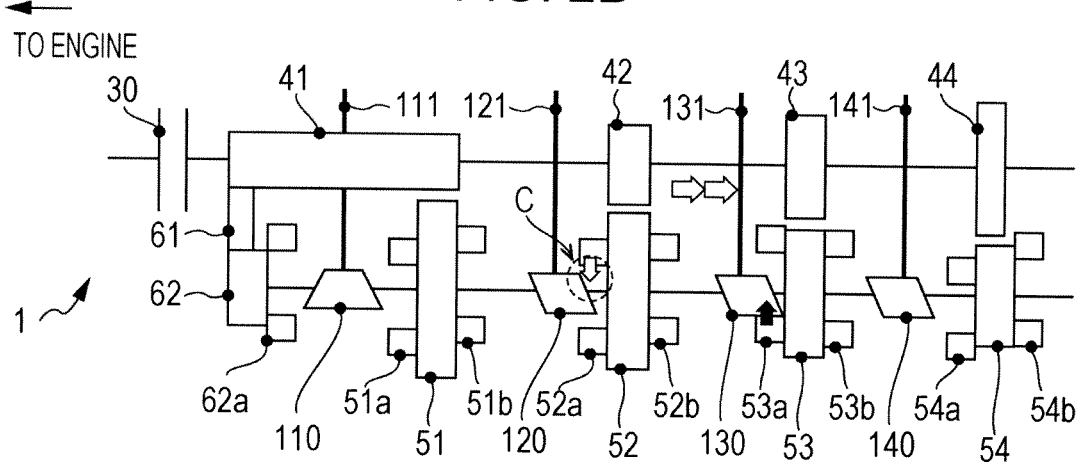
Figure 2C:
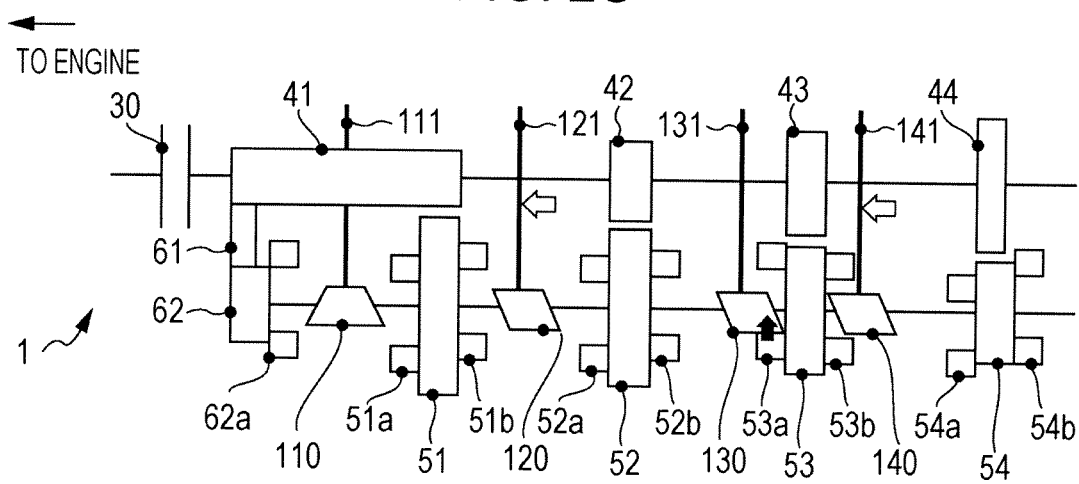

FIGS. 2A, 2B, and 2C illustrate an operation for upshifting from the second to third gear ratio.

FIG. 2A illustrates a state of the transmission 1 while the vehicle is travelling in the second gear ratio. Here, one dog tooth 52a of the second driven gear 52 and the first-second engagement member 120 are in pressure contact with each other with the application of the engine torque. One dog tooth 52b of the second driven gear 52 and the second-third engagement member 130 are apart from each other at a certain backlash.

As illustrated in FIG. 2B, firstly, the second-third engagement member 130 is driven in such a direction as to move away from the engine from an engaged-with-second position (first position), at which the second-third engagement member 130 is engaged with one dog tooth 52b of the second driven gear 52, to an engaged-with-third position (second position), at which the second-third engagement member 130 is engaged with one dog tooth 53a of the third driven gear 53, via the neutral position.

Thus, torque starts to be transmitted from the drive shaft 10 to the driven shaft 20 via the third drive gear 43 and the third driven gear 53.

As the speed of the driven shaft 20 increases and becomes higher than the rotating speed of the second driven gear 52, the first-second engagement member 120 and the dog tooth 52a of the second driven gear 52 become separated from each other. Further, one of the slanted portions of the first-second engagement member 120 is contacted and pushed by another dog tooth 52a as illustrated in a region C indicated by a dashed circle in FIG. 2B.

Thus, as illustrated in FIG. 2C, the first-second engagement member 120 moves toward the engine to the neutral position from an engaged-with-second position (second) position), at which the first-second engagement member 120 is engaged with one of the dog teeth 52a.

After that, the third-fourth engagement member 140 is driven toward the engine from the neutral position to an engaged-with-third position (first position), at which the third-fourth engagement member 140 is engaged with one of the dog teeth 53b of the third driven gear 53. Thus, the operation for upshifting from the second to third gear ratio is complete.

Note that synchronization is not required for driving the third-fourth engagement member 140 because simultaneous engagements of two different gear sets are prevented in such a manner that the first-second engagement member 120 is automatically pushed away once the second-third engagement member 130 is engaged with one of the dog teeth 53a of the third driven gear 53.

The downshifting operation will be described now. The number of engine revolutions has to be increased before the downshifting operation. The number of engine revolutions is increased by either one of a method of increasing the number of engine revolutions by downshifting without disengaging a clutch and by using inertia of a vehicle and a method of increasing the number of engine revolutions by disengaging a clutch and by blipping. The downshifting operation by the former method is performed to achieve the engine braking effect and thus is performed while the power is off. The downshifting operation by the latter method is performed while the clutch is disengaged. Thus, these operations are both performed while the power is substantially off.

For this reason, the operation of downshifting from the third to second gear ratio, in the power-off state (in a coasting state where the engine torque value is negative and the driven torque is input from the driving wheels to the driven shaft 20) will be described as an exemplary downshifting operation.

Figure 3A:
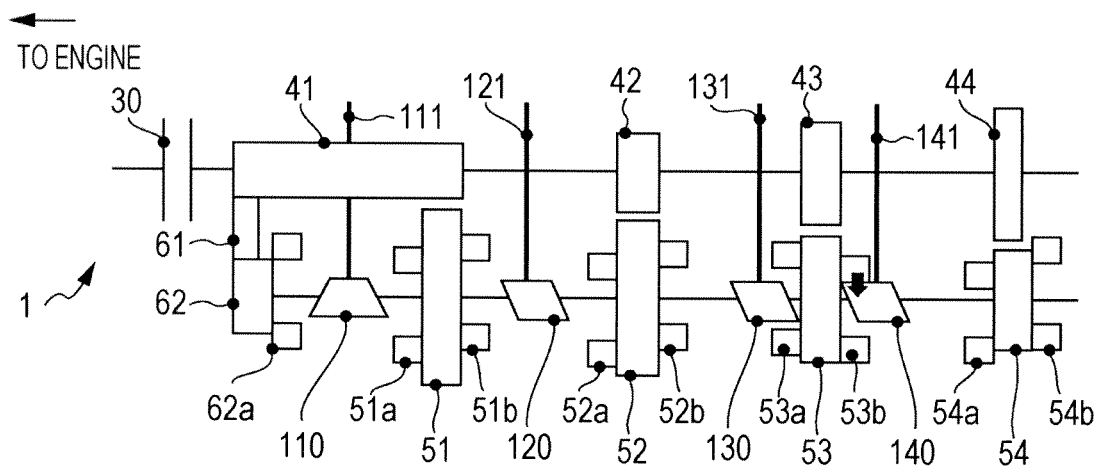
FIGS. 3A, 3B, and 3C illustrate an operation of the transmission illustrated in FIG. 1, for downshifting from the third to second gear ratio.
Figure 3B:
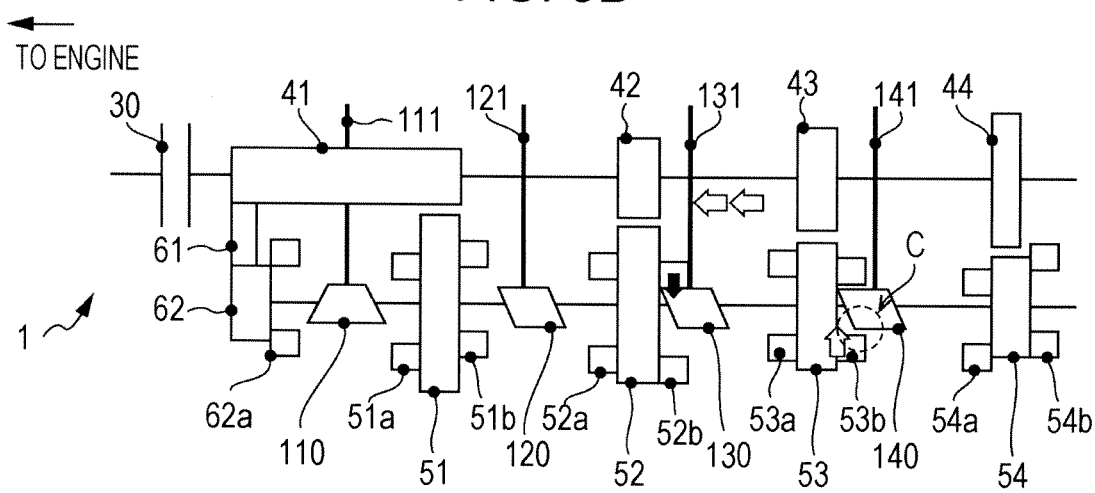
Figure 3C:
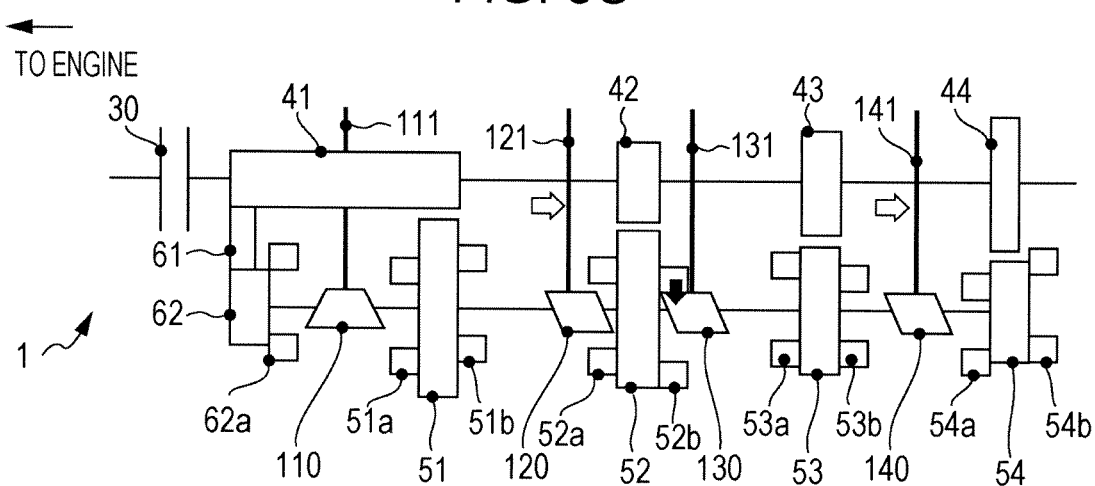

FIGS. 3A, 3B, and 3C illustrate an operation for downshifting from the third to second gear ratio.

FIG. 3A illustrates a state of the transmission 1 while a vehicle is travelling in the third gear ratio. Here, one dog tooth 53b of the third driven gear 53 and the third-fourth engagement member 140 are in pressure contact with each other with the application of the driven torque. One dog tooth 53a of the third driven gear 53 and the second-third engagement member 130 are apart from each other at a certain backlash.

As illustrated in FIG. 3B, firstly, the second-third engagement member 130 is driven toward the engine from the engaged-with-third position (second position), at which the second-third engagement member 130 is engaged with one dog tooth 53a of the third driven gear 53, to the engaged-with-second position (first position), at which the second-third engagement member 130 is engaged with one dog tooth 52b of the second driven gear 52, via the neutral position.

Thus, torque starts to be transmitted from the driven shaft 20 to the drive shaft 10 via the second driven gear 52 and the second drive gear 42.

Here, in order for the transmission 1 and the engine to be controlled synchronously, it is preferable that blipping control be performed, in which the clutch 30 is temporarily disengaged and engaged again after the number of engine revolutions is increased.

As the speed of the drive shaft 10 increases and becomes higher than the rotating speed of the third driven gear 53, the third-fourth engagement member 140 and the dog tooth 53b of the third driven gear 53 become separated from each other. Further, one of the slanted portions of the third-fourth engagement member 140 is contacted and pushed by another dog tooth 53b as illustrated in a region C indicated by a dashed circle in FIG. 3B.

Then, as illustrated in FIG. 3C, the third-fourth engagement member 140 moves from the engaged-with-third position (first position), at which the third-fourth engagement member 140 is engaged with one dog tooth 53b, to the neutral position in such a direction as to move away from the engine.

After that, the first-second engagement member 120 is driven from the neutral position to the engaged-with-second position (second position), at which the first-second engagement member 120 is engaged with one dog tooth 52a of the second driven gear 52, in such a direction as to move away from the engine. Thus, the operation for downshifting from the third to second gear ratio is complete.

As described above, the downshifting operation is usually performed while the power is off. Even in a kick-down operation where the downshifting operation is performed while the power is on, a blipping operation is performed to increase the number of engine revolutions, in which the clutch 30 is temporarily disengaged. For this reason, the order of moving the engagement members in the downshifting operation is not the reverse of that in the upshifting operation. The engagement members moved earlier in the upshifting operation need to be moved earlier in the downshifting operation.

In the embodiment, these engagement members are driven by the shift drum 200 having a structure that is described below.

FIG. 4 illustrates part of the shapes of the cam grooves of the shift drum 200.

Cam grooves are formed on the outer peripheral surface of the shift drum 200. The cam grooves include a reverse-first-engagement-member driving groove 210, a first-second-engagement-member driving groove 220, a second-third-engagement-member driving groove 230, and a third-fourth-engagement-member driving groove 240.

In the following description, the expression "a position closer to the K-th gear ratio (K=1, 2, 3, and so on) in the circumferential direction of the shift drum 200" means a position closer to a position at which a cam follower is held after a gear change to the K-th gear ratio is complete.

The reverse-first-engagement-member driving groove 210 guides the cam follower of the shift fork 111 and thus the shift drum 200 drives the reverse-first engagement member 110 via the shift fork 111 in the axial direction.

The reverse-first-engagement-member driving groove 210 includes a downshift-to-first slanted portion 211 and an upshift-to-second slanted portion 212.

During the downshift from the second to first gear ratio, the downshift-to-first slanted portion 211 is used to move the reverse-first engagement member 110 from the neutral position to an engaged-with-first position, at which the reverse-first engagement member 110 is engaged with one dog tooth 51a of the first driven gear 51.

During the upshift from the first to second gear ratio, the upshift-to-second slanted portion 212 is used to move the reverse-first engagement member 110 from the engaged-with-first position to the neutral position.

The downshift-to-first slanted portion 211 and the upshift-to-second slanted portion 212 are arranged separately from each other in the circumferential direction of the shift drum 200. Thus, a portion sandwiched between the downshift-to-first slanted portion 211 and the upshift-to-second slanted portion 212 has a width larger than the other portions of the reverse-first-engagement-member driving groove 210. With this structure, the path that the cam follower of the shift fork 111 takes for engaging the reverse-first engagement member 110 with the first driven gear 51 is different from that for disengaging the reverse-first engagement member 110 from the first driven gear 51, as illustrated in FIG. 4.

The first-second-engagement-member driving groove 220 guides the cam follower of the shift fork 121 and thus the shift drum 200 drives the first-second engagement member 120 via the shift fork 121 in the axial direction.

The first-second-engagement-member driving groove 220 includes an upshift-to-second slanted portion 222, a downshift-to-first slanted portion 221, a downshift-to-second slanted portion 223, and an upshift-to-third slanted portion 224.

During the upshift from the first to second gear ratio, the upshift-to-second slanted portion 222 is used to move the first-second engagement member 120 from the engaged-with-first position, at which the second engagement member 120 is engaged with one dog tooth 51b of the first driven gear 51, to engaged-with-second position, at which the second engagement member 120 is engaged with one dog tooth 52a of the second driven gear 52, via the neutral position.

During the downshift from the second to first gear ratio, the downshift-to-first slanted portion 221 is used to move the first-second engagement member 120 from the engaged-with-second position to the engaged-with-first position via the neutral position.

The upshift-to-second slanted portion 222 and the downshift-to-first slanted portion 221 are arranged in such a manner that the path that the cam follower of the shift fork 121 takes for upshifting to the second gear ratio is substantially the same as that for downshifting to the first gear ratio.

The upshift-to-second slanted portion 222 and the downshift-to-first slanted portion 221 are located at positions, in the circumferential direction of the shift drum 200, closer to the second gear ratio than the downshift-to-first slanted portion 211 of the reverse-first-engagement-member driving groove 210 is, and closer to the first gear ratio than the upshift-to-second slanted portion 212 is.

During the downshift from the third to second gear the downshift-to-second slanted portion 223 is used to move the first-second engagement member 120 from the neutral position to the engaged-with-second position.

During the upshift from the second to third gear ratio, the upshift-to-third slanted portion 224 is used to move the first-second engagement member 120 from the engaged-with-second position to the neutral position.

The downshift-to-second slanted portion 223 and the upshift-to-third slanted portion 224 are arranged separately from each other in the circumferential direction of the shift drum 200. Thus, a portion sandwiched between the downshift-to-second slanted portion 223 and the upshift-to-third slanted portion 224 has a width larger than the other portions of the first-second-engagement-member driving groove 220. With this structure, the path that the cam follower of the shift fork 121 takes for engaging the first-second engagement member 120 with the second driven gear 52 is different from that for disengaging the first-second engagement member 120 from the second driven gear 52, as illustrated in FIG. 4.

The second-third-engagement-member driving groove 230 guides the cam follower of the shift fork 131 and thus the shift drum 200 drives the second-third engagement member 130 via the shift fork 131 in the axial direction.

The second-third-engagement-member driving groove 230 includes a downshift-to-first slanted portion 231, an upshift-to-second slanted portion 232, an upshift-to-third slanted portion 234, and a downshift-to-second slanted portion 233.

During the downshift from the second to first gear ratio, the downshift-to-first slanted portion 231 is used to move the second-third engagement member 130 from the engaged-with-second position, at which the second-third engagement member 130 is engaged with one dog tooth 52b of the second driven gear 52, to the neutral position.

During the upshift from the first to second gear ratio, the upshift-to-second slanted portion 232 is used to move the second-third engagement member 130 from the neutral position to the engaged-with-second position.

The downshift-to-first slanted portion 231 and the upshift-to-second slanted portion 232 are arranged separately from each other in the circumferential direction of the shift drum 200. Thus, a portion sandwiched between the downshift-to-first slanted portion 231 and the upshift-to-second slanted portion 232 has a width larger than the other portions of the second-third-engagement-member driving groove 230. With this structure, the path that the cam follower of the shift fork 131 takes for engaging the second-third engagement member 130 with the second driven gear 52 is different from that for disengaging the second-third engagement member 130 from the second driven gear 52, as illustrated in FIG. 4.

The downshift-to-first slanted portion 231 and the upshift-to-second slanted portion 232 are positioned, in the circumferential direction of the shift drum 200, in substantially the same positions as the downshift-to-first slanted portion 211 and the upshift-to-second slanted portion 212 of the reverse-first-engagement-member driving groove 210, respectively.

During the upshift from the second to third gear ratio, the upshift-to-third slanted portion 234 is used to move the second-third engagement member 130 from the engaged-with-second position to the engaged-with-third position, at which the second-third engagement member 130 is engaged with one dog tooth 53a of the third driven gear 53, via the neutral position.

During the downshift from the third to second gear ratio, the downshift-to-second slanted portion 233 is used to move the second-third engagement member 130 from the engaged-with-third position to the engaged-with-second position via the neutral position.

The upshift-to-third slanted portion 234 and the downshift-to-second slanted portion 233 are arranged in such a manner that the path that the cam follower of the shift fork 131 takes for upshifting to the third gear ratio is substantially the same as that for downshifting to the second gear ratio.

The upshift-to-third slanted portion 234 and the downshift-to-second slanted portion 233 are positioned, in the circumferential direction of the shift drum 200, closer to the third gear ratio than the downshift-to-second slanted portion 223 of the first-second-engagement-member driving groove 220 is, and closer to the second gear ratio than the upshift-to-third slanted portion 224 is.

The third-fourth-engagement-member driving groove 240 guides the cam follower of the shift fork 141 and thus the shift drum 200 drives the third-fourth engagement member 140 via the shift fork 141 in the axial direction.

The third-fourth-engagement-member driving groove 240 includes a downshift-to-second slanted portion 241 and an upshift-to-third slanted portion 242.

During the downshift from the third to second gear ratio, the downshift-to-second slanted portion 241 is used to move the third-fourth engagement member 140 from the engaged-with-third position, at which the third-fourth engagement member 140 is engaged with one dog tooth 53b of the third driven gear 53, to the neutral position.

During the upshift from the second to third gear ratio, the upshift-to-third slanted portion 242 is used to move the third-fourth engagement member 140 from the neutral position to the engaged-with-third position.

The downshift-to-second slanted portion 241 and the upshift-to-third slanted portion 242 are arranged separately from each other in the circumferential direction of the shift drum 200. Thus, a portion sandwiched between the downshift-to-second slanted portion 241 and the upshift-to-third slanted portion 242 has a width larger than the other portions of the third-fourth-engagement-member driving groove 240. With this structure, the path that the cam follower of the shift fork 141 takes for engaging the third-fourth engagement member 140 with the third driven gear 53 is different from that for disengaging the third-fourth engagement member 140 from the third driven gear 53, as illustrated in FIG. 4.

The downshift-to-second slanted portion 241 and the upshift-to-third slanted portion 242 are positioned, in the circumferential direction of the shift drum 200, in substantially the same positions as the downshift-to-second slanted portion 223 and the upshift-to-third slanted portion 224 of the first-second-engagement-member driving groove 220, respectively.

The driving grooves 210 to 240 used for gear changes between first, second, and third gear ratios have only been described thus far. However, driving grooves (cam grooves) used for gear changes between other gear ratios can be also formed in substantially the same manner.

With the above-described structure, during a gear change between two adjacent gear ratios, an engagement member arranged in a space between adjacent gears corresponding to these gear ratios is driven first, and then other engagement members positioned on both sides of the engagement member are driven substantially simultaneously.

Each engagement member includes a detent system, which is not illustrated, for positioning the cam follower at the first and second positions. The reason for using the detent systems is that the cam followers are unable to be positioned at the first and second positions by simply using the driving grooves 210 to 240 while passing through the wide portions of the driving grooves 210 to 240.

After the gear change to and the selection of a desired gear ratio are complete, the engagement members are locked in the corresponding driving grooves.

According to the embodiment described above, the engagement members 120 to 160 that transmit a driven torque to gear sets corresponding to lower gear ratios and a driving torque from gear sets corresponding to higher gear ratios are arranged in spaces between adjacent gear sets. Each of the gear sets includes either one of the first to sixth drive gears 41 to 46 and a corresponding one of the first to sixth driven gears 51 to 56. Thus, the transmission 1 according to the embodiment can perform speedy gear changes between all the forward speeds (first to sixth gear ratios). In addition, the structure of the transmission 1 is made simpler.

Modifications

The present invention is not limited to the embodiment described above. The embodiment may be modified or changed in various ways, and the modifications and changes also fall within the technical scope of the present invention.
(1) In the transmission according to the embodiment, the fixed gears are mounted on the drive shaft while the rotatable gears and the shift mechanisms are mounted on the driven shaft. However, the rotatable gears and the shift mechanisms may be mounted on the drive shaft and the fixed gears may be mounted on the driven shaft.
(2) The transmission according to the embodiment achieves six forward speeds and one reverse speed, for example. However, the number of speeds is not particularly limited.
(3) The transmission according to the embodiment has been described as being longitudinally mounted, for example, but may also be mounted transversely.

The present invention is not limited to the transmission mounted to be adjacent to the engine. For example, the transmission may be mounted separately from the engine, i.e., may be a transaxle.

What is claimed is:
1. A transmission comprising:
a first rotating shaft;
a second rotating shaft arranged in parallel with the first rotating shaft; and
a plurality of gear sets that transmit power between the first rotating shaft and the second rotating shaft and that are arranged in order from low to high gear ratios,
wherein each gear set includes a fixed gear that is fixed to the first rotating shaft and a rotatable gear that is supported on the second rotating shaft so as to be rotatable relative to the second rotating shaft and that meshes with the fixed gear,
wherein each gear set includes first engagement means that is engaged with a first engagement-target portion formed on one end surface of the rotatable gear and thus transmits torque in a first rotational direction, second engagement means that is engaged with a second engagement-target portion formed on another end surface of the rotatable gear and transmits torque in a second rotational direction that is a direction opposite to the first rotational direction, and a shift mechanism that moves the first engagement means and the second engagement means independently of each other and relative to the rotatable gear in an axial direction,
wherein the first engagement means has a slanted portion that is contacted by the first engagement-target portion and thus allows the first engagement means to withdraw from the rotatable gear while the second engagement means is disengaged and when torque in the second rotational direction is input,
wherein the second engagement means has a slanted portion that is contacted by the second engagement-target portion and thus allows the second engagement means to withdraw from the rotatable gear while the first engagement means is disengaged and when torque in the first rotational direction is input, and
wherein the first engagement means of each gear set is configured to move integrally with the second engagement means of an adjacent one of the gear sets, and the second engagement means of each gear set is configured to move integrally with the first engagement means of an adjacent one of the gear sets.

2. The transmission according to claim 1,
wherein the gear sets corresponding to first to N-th (where N is an integer) gear ratios are arranged in order, and
wherein, between each pair of adjacent gear sets corresponding to the first to N-th gear ratios, the first engagement means of one of the gear sets corresponding to a lower one of the gear ratios and the second engagement means of another one of the gear sets corresponding to a higher one of the gear ratios are arranged so as to move integrally.

3. The transmission according to claim 1,
wherein the first engagement means transmits torque while power is off,
wherein the second engagement means transmits torque while power is on, and
wherein the shift mechanism disengages the first engagement means of one of the gear sets that has been engaged before a gear change and concurrently engages the second engagement means of another one of the gear sets that is to be engaged after the gear change, and then, after the second engagement means of the gear set that has been engaged before the gear change is contacted by the second engagement-target portion and thus disengaged, the shift mechanism engages the first engagement means of the gear set that is to be engaged after the gear change.

4. The transmission according to claim 2,
wherein the first engagement means transmits torque while power is off,
wherein the second engagement means transmits torque while power is on, and
wherein the shift mechanism disengages the first engagement means of one of the gear sets that has been engaged before a gear change and concurrently engages the second engagement means of another one of the gear sets that is to be engaged after the gear change, and then, after the second engagement means of the gear set that has been engaged before the gear change is contacted by the second engagement-target portion and thus disengaged, the shift mechanism engages the first engagement means of the gear set that is to be engaged after the gear change.

5. The transmission according to claim 1, wherein the fixed gear is formed integrally with the first rotating shaft.

6. The transmission according to claim 2, wherein the fixed gear of the plurality of gear sets includes teeth such that a number of the teeth of the fixed gear increases in order from the first gear set to N-th gear set of the gear sets, and
wherein the rotatable gear of the gear sets includes teeth such that a number of the teeth of each rotatable gear decreases in order from the first gear set to N-th gear set of the plurality of gear sets.

7. The transmission according to claim 6, wherein the slanted portion of the first engagement means is disposed on a surface that is different from a surface of which the teeth of the rotatable gear is pressed against during torque transmission.

\* \* \* \* \*